(12) United States Patent
Wright et al.

(10) Patent No.: US 8,954,343 B2
(45) Date of Patent: Feb. 10, 2015

(54) PERSON-TO-PERSON MATCHING SYSTEM

(71) Applicant: Woofound, Inc., Middle River, MD (US)

(72) Inventors: Carson Wright, Baltimore, MD (US);
Joshua Spears, Baltimore, MD (US);
Jason Truluck, Baltimore, MD (US);
Noreen Honeycutt, Baltimore, MD (US); Colin Murray, Churchville, MD (US); Daniel Sines, Middle River, MD (US); Randie V. Ursal, Baltimore, MD (US)

(73) Assignee: Woofound, Inc., Baltimore, MD (US)

( * ) Notice: Subject to any disclaimer, the term of this patent is extended or adjusted under 35 U.S.C. 154(b) by 55 days.

(21) Appl. No.: 13/837,684

(22) Filed: Mar. 15, 2013

(65) Prior Publication Data

US 2013/0318162 A1 Nov. 28, 2013

Related U.S. Application Data

(63) Continuation-in-part of application No. 13/478,817, filed on May 23, 2012.

(60) Provisional application No. 61/530,926, filed on Sep. 2, 2011.

(51) Int. Cl.
*G06Q 30/00* (2012.01)
*G06Q 10/00* (2012.01)
(Continued)

(52) U.S. Cl.
CPC ............... *H04L 67/22* (2013.01); *G06Q 30/02* (2013.01); *G06Q 30/08* (2013.01)
USPC ........................................ 705/7.32; 705/7.29

(58) Field of Classification Search
CPC .............. G06Q 30/0203; G06Q 30/02; G06Q 30/0204; G06Q 30/0201; G06Q 10/06; G06Q 30/0281; G06Q 30/06; G06Q 30/016; G06Q 10/10

See application file for complete search history.

(56) References Cited

U.S. PATENT DOCUMENTS 6,655,963 B1 * 12/2003 Horvitz et al. ................. 434/236
7,342,583 B2 * 3/2008 Behar et al. .................... 345/440
(Continued)

OTHER PUBLICATIONS

Gregory J. Boyle, Myers-Briggs Type Indicator (MBTI): Some psychometric limitations, 1995, Human Social Sciences Papers, Faculty of Humanities and Social Sciences, pp. 2-4.*

(Continued)

*Primary Examiner* — Justin M Pats
*Assistant Examiner* — Nancy Prasad
(74) *Attorney, Agent, or Firm* — Larry J. Guffey, Esq.; Oliver & Grimsley, LLC

(57) ABSTRACT

An improved system for matching individuals seeking personal relationships includes: (a) a plurality of personality categories into which an individual may be categorized, (b) a plurality of psychology-based, personality traits, (c) a plurality of preferences on various subjects that an individual may have, (d) a plurality of images for consideration by an individual, each of the images configured such that an individual who would chose to be associated with an image can be assessed to possess one of the plurality of personality traits and preferences, (e) a user interface for presenting the plurality of images and allowing an individual to identify with which of these the individual elects to be associated, and (f) an algorithm configured to utilize these elected associations to categorize this individual into one of the personality categories and to ascribe to the individual a specific set of preferences in various subject areas.

14 Claims, 8 Drawing Sheets

(51) Int. Cl.
*H04L 29/08* (2006.01)
*G06Q 30/02* (2012.01)
*G06Q 30/08* (2012.01)

(56) References Cited

U.S. PATENT DOCUMENTS

| | | | | |
|---|---|---|---|---|
| 7,454,357 | B2* | 11/2008 | Buckwalter et al. | 705/346 |
| 7,552,060 | B2* | 6/2009 | Vest | 705/1.1 |
| 8,195,668 | B2* | 6/2012 | Drennan et al. | 707/748 |
| 8,341,101 | B1* | 12/2012 | Treiser | 706/45 |
| 8,473,490 | B2* | 6/2013 | Bonilla et al. | 707/732 |
| 2003/0204437 | A1* | 10/2003 | Flender et al. | 705/10 |
| 2004/0162821 | A1* | 8/2004 | Buckwalter et al. | 707/3 |
| 2004/0210661 | A1* | 10/2004 | Thompson | 709/228 |
| 2004/0260781 | A1* | 12/2004 | Shostack et al. | 709/207 |
| 2005/0209909 | A1* | 9/2005 | Dull et al. | 705/10 |
| 2006/0041480 | A1* | 2/2006 | Briggs | 705/14 |
| 2006/0149614 | A1* | 7/2006 | Suzuki et al. | 705/10 |
| 2006/0282306 | A1* | 12/2006 | Thissen-Roe | 705/11 |
| 2007/0012325 | A1* | 1/2007 | Greenwald | 128/898 |
| 2007/0053513 | A1* | 3/2007 | Hoffberg | 380/201 |
| 2007/0078869 | A1* | 4/2007 | Carr et al. | 707/100 |
| 2007/0192106 | A1* | 8/2007 | Zilca | 704/270 |
| 2007/0282621 | A1* | 12/2007 | Altman et al. | 705/1 |
| 2008/0126426 | A1* | 5/2008 | Manas et al. | 707/104.1 |
| 2008/0263446 | A1* | 10/2008 | Altberg et al. | 715/706 |
| 2010/0077032 | A1* | 3/2010 | Drennan et al. | 709/206 |
| 2010/0145869 | A1* | 6/2010 | Brown | 705/319 |
| 2011/0029566 | A1* | 2/2011 | Grandison et al. | 707/783 |

OTHER PUBLICATIONS

Pearson, Marcia, The Dichotomous Relationship Between Personality Traits and Repatriation Decisions by Information Technology Workers, 2013, UMI Disertations Publishing.*

Anderson, Philip H. and Lawton, Leigh, Development in Business Simulation & Experiential Exercises, Personality Types and Total Enterprise Simulation Performance, 1991, vol. 18, pp. 1-4.*

Snead T. Dichotomous musical worlds: Interactions between the musical lives of adolescents and school music-learning culture. [serial online]. n.d.;(2010), p. n/aAccessed May 30, 2014.*

Chatman J. Matching People and Organizations: Selection and Socialization in Public Accounting Firms. Administrative Science Quarterly [serial online]. Sep. 1991;36(3):459-484. Available from: Business Source Complete, Ipswich, MA. Accessed May 30, 2014.*

\* cited by examiner

FIG. 2

| Pairs of Representative Dichotomous Personality Traits 10 ||
|---|---|
| Aggressive--Passive | Extreme--Moderate |
| Agitated--Serene | Erratic--Steady |
| Alert--Inattentive | Impulsive--Inhibited |
| Altruistic--Self Serving | Funny--Serious |
| Analytical--cursory | Rigid--Flexible |
| Anxious--Calm | Goal-Oriented--Process-Oriented |
| Apathetic--Passionate | Loyal--Fickle |
| Attached--Detached | Self-Aware--Unconscious |
| Attention-Seeking--Private | Introspective--Externally-Focused |
| Attuned--Unattuned | Intuitive--Rational |
| Blunted--Expressive | Sensitive--Tough |
| Avoidant--Direct | Group-Oriented--Prefers One-on-One |
| Caring--Indifferent | Faithful--Unfaithful |
| Careless--Meticulous | Follower--Leader |
| Casual--Formal | Friendly--Unfriendly |
| Cautious--Daring | Future-Focused--Nostalgic |
| Charismatic--Dull | Heedless--Mindful |
| Open-Minded--Closed-Minded | High-Energy--Low-Energy |
| Cognitive--Emotional | Inorganic--Organic |
| Compassionate-- Unfeeling | Likes Familiarity--Likes Novelty |
| Competitive--Non-Competitive | Narcissistic--Thinks Beyond Oneself |
| Compulsive--Spontaneous | Oblivious--Vigilant |
| Concrete-- Imaginative | Observant-- Unaware |
| Confident--Easily-Slighted | Optimistic--Pessimistic |
| Conventional--Unconventional | Particular--Easy-Going |
| Conversational--Quiet | Peaceful---Excitable |
| Creative--Uncreative | Perfectionistic--Reckless |
| Curious--Disinterested | Playful--Sober |
| Decisive--Indecisive | Practical--Whimsical |
| Deliberate--Instinctive | Progressive--Regressive |
| Dependent--Independent | Protective--Unprotective |
| Detail-Oriented--vague | Realistic--Unrealistic |
| Distractable--Focused | Regulated--Unregulated |
| Dominant--Submissive | Reserved--Sociable |
| Earthy--Urbane | Romantic--Unromantic |

FIG. 3

| Representative List of the Subject Areas or Foundational Issues of Relationships That Are |
|---|
| Communication Style |
| Money |
| Intimacy |
| Romance |
| Politics |
| Religion |
| Socializing |
| Body Clock |
| Logic vs Emotion |
| Introversion/Extraversion |
| Dealing With Conflict |
| Boundaries |
| Novelty Needs |
| Spontaneity |
| Creativity |
| Flexibility |
| Love Language |

FIG. 4

| \multicolumn{4}{c|}{Representative Preferences 12 In Various Subject Areas} ||||
|---|---|---|---|
| Music | Sports | Religion | Food |
| Opera | Swimming | Folk Religion | Gourmet |
| Funk | Diving | Sikhism | Kosher |
| Dance | Wrestling | Taoism | Ice Cream |
| Big Band | Boxing | Confucianism | Fast Food |
| Folk | Tennis | Atheist | Vegetarian |
| Latin | Martial Arts | Hinduism | Organic |
| Jazz | Auto Racing | Buddhist | Sandwiches |
| Blues | Golf | Muslim | Salads |
| Classical | Lacrosse | Islam | Pizza |
| Instrumentals | Soccer | Judaism | Diner |
| R & B | Basketball | Christian | Steakhouse |
| Hip Hop & Rap | Baseball | Catholic | Bakery |
| Country | Football | Baptist | Seafood |
| Movies/Films | Hobbies | Outside Interests | Cuisine |
| Animation | Reading | Travel | American |
| Independent | Card Playing | Politics | Spanish |
| Foreign | Dance | Sciences | French |
| Documentary | Walking | Medicine | Indian |
| Family | Shopping | Art | Thai |
| Classic | TV Watching | Literature | Vietnamese |
| Romance | Web Surfing | Museums | Korean |
| Thriller | Attending | News | Chinese |
| Sci-Fi | Performing Arts | Current Events | Japanese |
| Drama | Productions | Mathematics | Mexican |
| Horror | Poetry | Social Scene | Italian |
| Comedy | Financial Investing | Fashion | Russian |
| Action | Volunteering | Automobiles | Mediterranean |
| Adventure | Crafts | Collecting | Greek |
| Historical | Choir | Law | African |

FIG. 5

| Representative Personality Categories 14 and Their Associated Personality Traits 10 | | | | | |
|---|---|---|---|---|---|
| Creator | Innovator | Warrior | Sage | Hero | Scribe |
| Passionate | Aggressive | Concrete | Analytical | Altruistic | Meticulous |
| Expressive | Daring | Cursory | Avoidant | Caring | Perfectionist |
| Open-minded | Confident | Detached | Formal | Emotional | Compulsive |
| Creative | Dominant | Direct | Cognitive | Conversational | Strict |
| Eclectic | Enthusiast | Competitive | Serious | Dependent | Decisive |
| Erratic | Impulsive | Instinctive | Rational | Patient | Follower |
| Flexible | Funny | Steady | Inquisitive | Interactive | Rigid |
| Playful | Leader | Tough | Observant | Loyal | Particular |
| Unrealistic | Excitable | Tense | Curious | Self-aware | Alert |
| Romantic | Sociable | Regressive | Calm | Intuitive | Anxious |
| Lenient | Visionary | Regulated | Solitary | Sensitive | Conventional |
| Serene | Friendly | Relaxed | Reserved | Faithful | Stable |
| Indecisive | Intense | Realistic | Introverted | Sensing | Uncreative |
|  | Urbane | Casual | Private | Optimistic | Superficial |
|  | Impatient | Practical | Focused | Introspective | Submissive |
|  |  |  | Peaceful | Protective | Shallow |
|  |  |  | Mellow | Mindful | Passive |

Personality Traits Assigned:

Competitive

Physically Driven

Can Delay Gratification

Compulsive

Focused

Preferences Assigned In The Subject Area of Cuisine:

Spaghetti

Pasta

Italian Cuisine

European Cuisine

PERSON-TO-PERSON MATCHING SYSTEM

CROSS-REFERENCE TO RELATED APPLICATIONS

This a Continuation-In-Part Patent Application and claims the benefit of Provisional Patent Application No. 61/530,926, filed Sep. 2, 2011 and Regular patent application Ser. No. 13/478,817, filed May 23, 2012, with both being filed by the present inventors. The teachings of these applications are incorporated herein by reference to the extent that they do not conflict with the teaching herein.

BACKGROUND OF THE INVENTION

1. Field of the Invention

The present invention relates generally data processing in a social networking environment. Specifically, the present invention relates to the operation of matching individuals, each of whom is seeking to form personal relationships, with other like minded individuals.

2. Description of the Related Art

Various online person-to-person matching services exist. The techniques utilized to create these matches usually depend on substantial data input by a prospective service user—i.e., the prospective user of such a service has to initially answer a multitude of personal, professional, etc. questions that are put to them with the use of especially designed screen shots of written questionnaires that are created and processed by the software that helps to control the operation or the matching service's website. The prospective user's data input or answers are then categorized in supposedly proprietary ways to arrive at an informative, user profile that is matched against the similar profiles of other users.

However, there is a significant level of user feedback which suggests widespread dissatisfaction with these current means of data input, the accuracy or usefulness of the resulting user profiles, and the ultimate matches which are generated through and by these matching services. Accordingly, there is a need for these matching services to have improved prospective user data input means, user profile development techniques and performance in the quality of the services they provide.

SUMMARY OF THE INVENTION

Recognizing the need for the development of an improved system and method for person-to-person matching, the present invention is generally directed to overcoming the problems and disadvantages exhibited by the existing person-to-person matching services.

According to the present invention, an improved system tor optimally matching an individuals seeking personal relationships includes: (a) a plurality of personality categories into which an individual may be categorized based upon the behavior that is predicted for the individual, (b) a plurality of psychology-based, personality traits that an individual may have and which are configured such that a specific set of these personality traits categorizes the individual into one of the plurality of personality categories, (c) a plurality of preferences on various subjects that an individual may have and which are configured such that a specific set of these preferences is informative of how an individual would make a selection decision regarding the various subjects, (d) a plurality of images for consideration by an individual, each of the images configured such that an individual who would chose to be associated with an image can be assessed to possess a characteristic chosen from the group including one of the plurality of personality traits and preferences, (e) a means for presenting to an individual the plurality of images and allowing the individual to identify with which of the plurality of images the individual elects to be associated, (f) a first algorithm that is configured to utilize these elected associations of the individual to categorize this individual into one of the personality categories and to ascribe to the individual specific sets of preferences in various subject areas, and (g) a second algorithm that is configured to optimally match an individuals seeking to establish personal relationships by utilizing the personality category and ascribed specific set of preferences for each of the individuals seeking a match.

The present invention can also be considered to be a form of a user interface which is used to improve the performance of existing person-to-person matching services. As such a tool, it is implementable on a computer that takes as its input simple user responses or selections according to whether the user chooses "me" or "not me" in response to their individual preferences to a series of images which are shown to the user. Unbeknownst to the user, each image has been tagged/assigned certain ranked personality traits or preferences in various subject areas according to the content of the images. These responses to the tagged images are used to categorize the individual into a personality category and ascribe a set of preferences pertaining to a specific subject area. Such a profile is then matched against a database of the similarly assessed profiles of other users of the matching system. The result of this matching is the compiling of a list of the names of the other system users who seem to be optimally matched for an introduction to each other.

Thus, there has been summarized above (rather broadly and understanding that there are other preferred embodiments which have not been summarized above) the present invention in order that the detailed description that follows may be better understood and appreciated.

BRIEF DESCRIPTION OF THE DRAWINGS

FIG. 2 provides a representative list of the dichotomous personality traits identified and used by the present invention.

FIG. 3 provides a representative list of the various subject or issue areas that are assessed by the present invention and where one's preferences in these are used to make matching decisions.

FIG. 4 provides a representative list of preferences in various subject areas that are informative of how one having a specific set of such preferences would make a selection decision regarding matters in these subject areas.

FIG. 5 provides a representative listing of personality categories that could be used by the present invention and the personality traits associated with each of them.

DESCRIPTION OF THE PREFERRED EMBODIMENT

Figure 1:
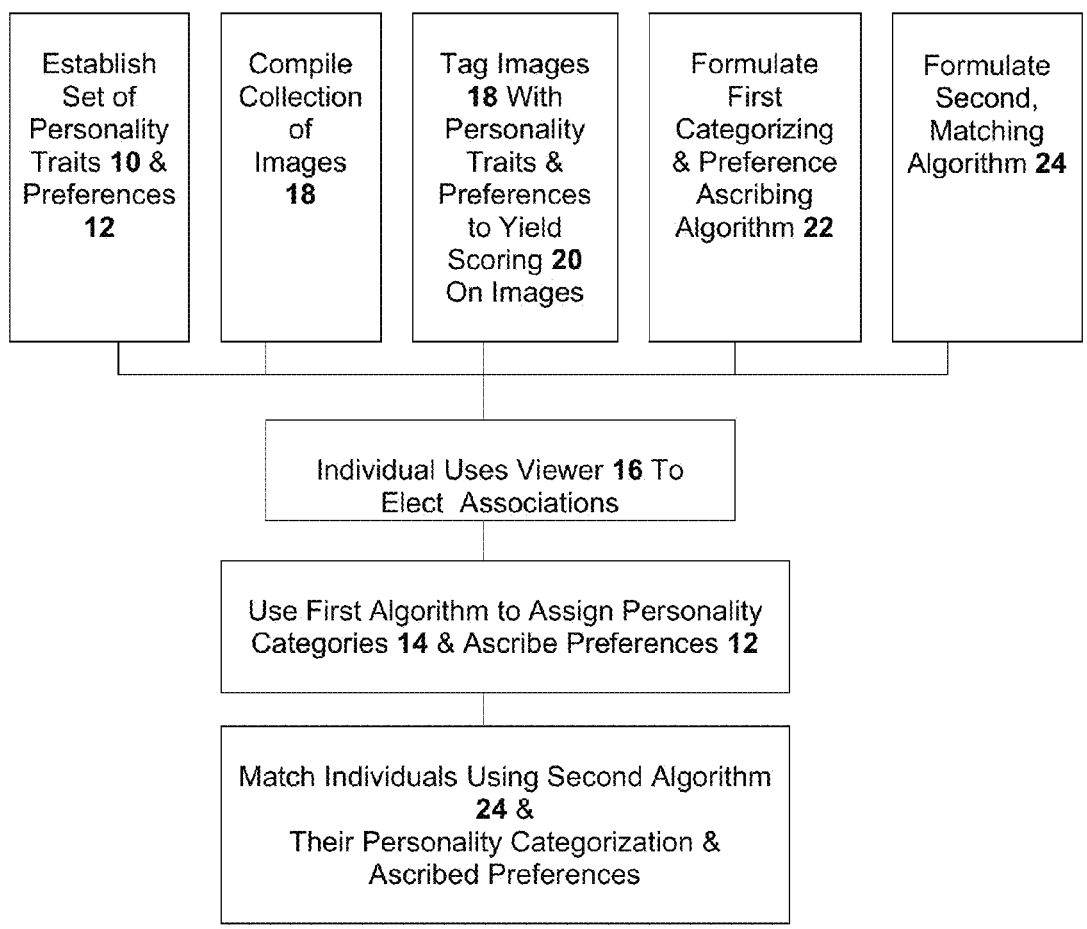
FIG. 1 is a flow diagram representation of a preferred embodiment of the present invention in the form of an improved method for optimally matching individuals seeking to establish personal relationships.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention 1 seeks to extend to person-to-person matching the applicability of the present Assignee's novel matching techniques and user interfaces—see this application's previously reference priority documents. These novel matching techniques have previously been used for performing a wide assortment of matches—including: (a) consumers or individuals with businesses—product and service providers (e.g., restaurants, theaters, medical care, legal advice, experiential events) and (b) individuals to those things that they think they want or need from a career perspective (e.g., academic and counseling, career advancements).

The present invention generally relates to an improved method or system for matching individuals for the purpose of allowing them to consider forming relationships with each other. Alternatively, the present invention can be considered to be an improved user interface that relates to a system and method for yielding improved, more satisfying individual relationship matches.

However, the present invention 1 differs from prior matching services in that it develops novel psychology-based, profiles for the individuals which it seeks to serve. These profiles contain far more than the standard data which is usually collected. The present invention's user profiles contain a novel identification of the personality traits 10 and preferences 12 of a match service user, especially those which the present inventors have found to be predictive of whether an individual having one of the many subsets of these traits and preferences is likely to be optimally satisfied with a resulting match with another similarly assessed person.

These personality traits 10 are based on the clinical knowledge that many personality traits are ubiquitous, and exist to varying degrees in each individual. Consequently, sets of dichotomous personality traits have been selected in order to measure the degree to which each user of the present invention possesses distinct traits. Specific sets of these traits are considered to be predictive of an individual's behavior.

While individuals' behaviors can vary greatly, the inventors of the present invention maintain that, for the purposes of matching to enable the forming of relationships, it is possible to classify people's behavior into certain general categories or personality categories 14. Furthermore, the present invention maintains that each of these personality categories can be best understood or defined in terms of the personality traits 10 that are associated are ascribed to each of them. For people matching purposes, the present invention seeks to assess people so as to be able to categorize them into one of the herein defined personality categories. This assessment process involves the use of the present invention's unique user interface 16.

The process or method of the present invention, see FIG. 1, begins by showing or giving an individual or system user a tutorial overview of the steps in this invention's matching process. A user profile is developed for all those individuals seeking matches. Each of these profiles consists of a current and representative picture of the system user, a system determined psychology-based, personality categorization of the user, and a system assessment of a specific set of preferences 12 that is informative of how the individual would make selection decisions regarding various subjects, issues or topics. Some minimal demographic and other information is also collected, such as the individual's geographic location, age, sexual preferences for their match, and the identification of possible "deal breakers" (issues or characteristics that would never be acceptable in a potential match), in order to further enhance the system's ability to achieve the best possible matches.

Following the collection of this information, the user is invited to play with or utilize the present invention's unique user interface 16 or "slider" in order to allow the system to personality categorize the user and to deduce or ascribe to the user a specific set of preferences 12 in various subject or issue areas based on the personality trait and preference data collected by utilizing methodology of the present invention. This interface 16 or personality and preference assessment or association tool entails a user of this service selecting "me (i.e., the user associates him/her-self with the image)" or "not me" as he/she views a means for viewing or an image viewer (e.g., a website that provides this matching services and wherein one uses his/her computer (of the type having a video monitor and a processor) to access the internet and the website and to then view the images on one's own monitor or display screen) or a carousel of these photographic images (i.e., reproductions of what a human eye sees) 18. Unbeknownst to the viewer, these images have ranking or scoring 20 for personality traits and preferences in various subject, issue or topic areas associated with each image—i.e., personality traits and preferences in various subject areas are ascribed to each of the images according to whether one who possess a specific personality trait would be psychologically predicted, upon considering one of the images, to associate himself or herself with the considered image.

See FIGS. 2-3 for representative lists of the personality traits and various subject, issue or topic areas that are assessed by the present invention. See also FIG. 4 for a representative list of preferences for which assessments could be made in eight of the various subject areas of the present invention.

A preferred embodiment of traits for the present invention is a set of forty seven pairs of key traits, where each positive trait has a corresponding negative trait (e.g., passion vs. apathy), thus, there are ninety four total traits. Other empirically tested personality indexes, such as The "Meyers-Briggs Type Indicator," also measure dichotomous traits resulting in sixteen possible outcomes/variables. The forty seven pairs of dichotomous traits in the present invention can result in a considerably more definitive physiological assessment of an individual that that which can be obtained using Meyers-Briggs indicators.

For example, an initial set of images 18 could consist of one hundred images designed to measure and collect data on a user's personality and preferences in various subject areas— including preferred communication style, importance of another's physical appearance, another's degree of introversion/extroversion, social skills, educational level, degree of career success, recreational activities and hobbies, etc.

Each of these images 18 will usually have three to seven, ranked personality traits 10 assigned to or "scored to" or "tagged to" it as well as between two to four levels of preference 12 informative data. With every "me" or "not me" response to each image, personality trait and preference data is collected that will eventually lead. to the categorization of the individual into one of a plurality of personality categories 14. See FIG. 5 for a representative listing of such personality categories 14 and the personality traits 10 associated with each of them.

Utilizing this "scoring" 20 or "means for scoring for ascribing personality traits and preferences to the images," the sum of a user's associations with the images is used by a first algorithm 22 or algorithmic process of the present invention to yield an identification of a set of personality traits and preferences that best characterizes or categorizes the user's personality and preferences on various subject matters. There are many relatively simple, well known algorithms that can perform this function (e.g., define the categorization of one's personality in terms of set of personality traits that were most often "selected" or "not selected" in responding "me" or "not me" to the images the user viewed and to which were scored various personality traits, or identify one's preferences over a wide assortment of issues and topics).

For example, with regard to categorizing one's personality, if we have 100 images that are each scored with 7 personality traits, a user will in viewing and responding "me" or "not me" to these images be effectively making 700 personality trait selections. If there are only 50 pairs of personality traits, the average number that any trait would be selected is 7. However, some of the traits could unknowingly be selected 35 or more times while others are selected only 2 to 3 times. Rank ordering these traits in terms of how many times they were selected will give one a simple criteria or first algorithm for identifying a set of personality traits that best characterizes or categorizes the user's personality.

Similar types of process steps apply to the task of using such a first algorithm to identify one's personal preferences over a wide range of topics, areas or issues of interest—i.e., score the images with preference information and use a system user's "me" or "not me" elections to discern these preferences.

For example, suppose we want to assess an individual's preference in the subject area of "cuisine." A number or series of images can be used to assess for one's preferences in this or any other subject area.

For assessing "cuisine" preferences, the first of these images could be an image of a plate of spaghetti. Unbeknownst to the one being assessed, this image has been tagged with several preferences, i.e. Italian cuisine with a value of 8, European cuisine with a value of 6, and Food with a value of 3, Pasta with a value of 5, and Cheese with a value of 2, where the value for a preference indicates the relative weight or importance of that preference to the image it is attached to. Since Spaghetti is more Italian than European, the Italian cuisine preference on Spaghetti is weighted higher than the European cuisine preference. The user's selection of "me" or "not me" and therefore the user's decision to be associated or not with the content or message of the image/slider either adds or subtracts these weights from the users own set of preferences. For example, clicking "me" to Spaghetti would add 8 value to the user's Italian cuisine preference. On the other hand clicking "not me" to Spaghetti would subtract 6 value from the user's European cuisine preference.

The second of these images could be "French Cuisine" and show an assortment of French foods. "French Cuisine" is assumed to have the following preferences: Baguette with a value of 6, Bisque with a value of 6, French cuisine with a value of 8, European cuisine with a value of 4, and Cheese with a value of 2. Assuming the user being assessed selects "not me" to this image, their Baguette preference would have 6 subtracted from it, their Bisque preference would have 6 subtracted from it, their French cuisine preference would have 8 subtracted from it, their European cuisine preference would have 4 subtracted from it, and their Cheese preference would have 2 subtracted from it.

After viewing a series of such images, the user should have accumulated values for each of the preferences on the images. The users preferences having the highest positive or negative values are declared to be those assessed preferences which have the greatest likelihood of actually reflecting what the assessed one prefers. For example, after the examples of the two images viewed above and the system user's selections of "me" and "not me" to the first and second respective images, we have these total preference scores: Italian cuisine with a value of 8, European cuisine with a value of 2, French cuisine with a value of −8, Food with a value of 3, Baguette with a value of −6, Bisque with a value of −6, Pasta with a value of 5, and Cheese with a value of 0. We at this stage conclude that the one being assessed prefers Italian cuisine, but does not prefer French cuisine. We can also say at this point that the user prefers Pasta over Baguettes and Bisque, and is ambivalent about Cheese. We can also see that the user likes Food in general but has low values for specific food types, meaning that we need more information to make any definitive assessments regarding them. This will come after more images are viewed and "me" or "not me" selections are made.

Since there are many, well-known algorithmic processes or algorithms that can distinguish between the alternative personality categories into one may be categorized and also discern an individual's preferences, these algorithmic processes will not be discussed further herein. All such well-known, first algorithmic processes are considered to come within the scope of the present invention.

After the completion of this initial image viewing or slider assessment, a system user's personality is usually found to be best or most accurately characterized by not just one specific personality category 14, but by a blend of such categories. For example, assume the present invention is operating with six defined personality categories, A-F. In this instance, it would be possible to categorize a system user who is being evaluated as being categorized into a category that is a blend of the six categories—this could be quantified by defining the % to which a user's personality is assessed to lie in each of the six categories, and wherein the sum of these six percentages equals 100%. Research using the present invention has often shown that it is usually only necessary to use two, of an available six or more, categories to adequately characterize the personality of most individuals.

Figure 6A:
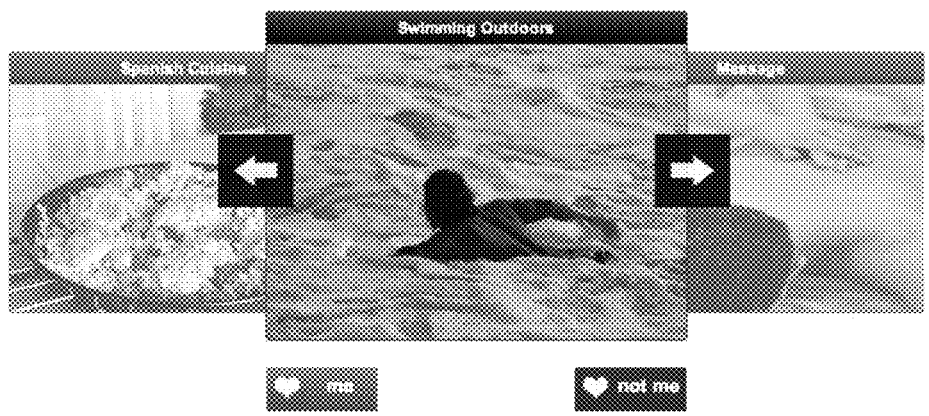
FIGS. 6(a)-6(c) provide representative images, shown in groups of three, which could be used by the present invention.
Figure 6B:
Figure 6C:
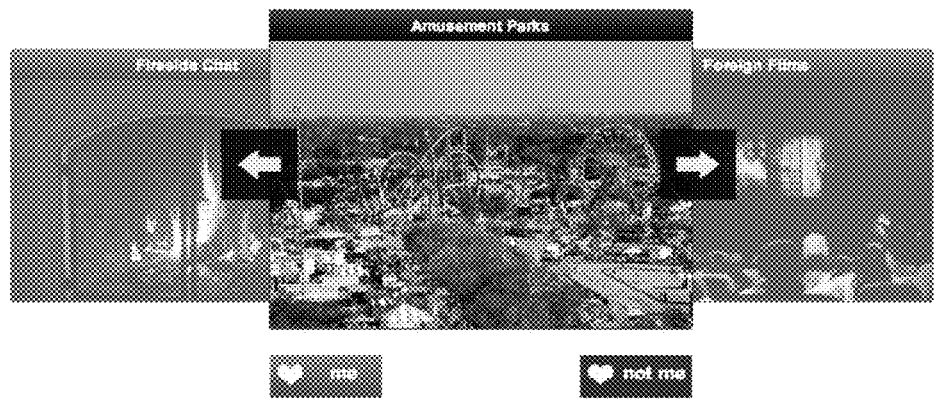

The carousel of images 18 of the present invention is a unique application of existing technology to improve the classic matching process. This carousel or slider is unique itself. In a preferred embodiment, it is a user interface by which a series of pre-defined but randomly selected images are displayed such that: (i) the image for consideration is larger than the previous and next image, (ii) the previous and next images have a lower opacity, (iii) a user utilizes an input device, such as a mouse or a finger on a touch screen, to go forward or back in the array of images, and (iv) with each image, the user selects (or deselects) whether such image is representative of that person's likes or dislikes by selecting "me" or "not me." See FIGS. 6(a)-6(c).

Each image 18 may also have a written or spoken title or another communication means (e.g., a recording image of music or other types of sound, or both a written and verbal message) affixed to or associated with it. This means or message seeks to help to clarify for the user the nature of the image and the activity, experience, quality, etc. which the viewing or consideration of the image is attempting to determine whether the user "will" or "will not" elect to be associated with the image.

The present invention 1 when implemented as part of a social media network allows it's user to go beyond blogging, sharing photos, postings, social schedules and updates, and to engage and connect with others whose paths they may not have crossed but for the trait matching services of the present invention.

The user interface 16 of the present invention focuses individuals on active engagement, instead of passive observation. It also has the ability to bring together friends and family, work associates, casual acquaintances and even like-minded strangers to engage in more rewarding relationships.

The present invention establishes a dynamic new relationship between individuals. By potentially matching individuals based upon a shared affinity of preferences 12 in various subject areas (e.g., hobbies, outside interests, recreational activities) and personality traits 10, the communications platform of the present invention can serve as an improved means for connecting individuals.

The present invention 1 can also be considered as a turnkey inquiry system that optimally matches users' based on the individual's personality traits and preferences in various subject areas. It is configurable in such a way that it is available both as a mobile application on any smart phone and as an online web application.

A system user's responses to the "scored" or tagged images 18 are stored and used to determine the user's personality traits and preferences in various subject areas, which form part of a system user's profile. Such a profile is then matched against a database of the similar profiles of other users. The result of this matching is the compiling of a list of ranked users having similar personality traits (i.e., categorized into the same personality category) and wherein the individual to whom one is being matched has the maximum degree possible of compliance with the other's specific set of preferences in various subject areas.

It should be noted that the tagging or scoring 20 aspect of the present invention is unique in that these personality traits and preference are not disclosed to the user. The benefit of this is that the user cannot in any way bias this identification of his/her personality traits so as to seek to be matched with a particular type of individual.

When a user's personality category 14 has been determined and the user's preferences 12 in various subject areas are sufficiently identified, the user begins the present invention's matching process by executing a "find"or match function, and at that time the user's profile is processed in a second algorithm 24 of the present invention. Since there are again, many algorithmic processes or algorithms that can handle this matching task, we only below give a representative way or process for this matching and note that all such, commonly-known algorithmic processes should be considered to come within the scope of the present invention.

In this example, the profiles of potential match candidates are first checked against that of the one seeking a match. Those candidates with profiles that reveal they would not be compliant with the seeker's "deal breaker" conditions are eliminated from consideration. The field of potential match candidates is then searched to identify those that have been categorized into similar personality categories. These are then assessed for how well their preferences in various subject areas match-up with or are compliant with the specific set of preferences in various subject areas that have been ascribed to the one seeking the match.

One way to quantify this compliance is to begin by assigning an importance weighting to each of the subject areas in which preferences have been evaluated and ascribed. For example: religion—2, outside interest—2, hobbies—2, music—1, movies—0.5, food—0.5. Then, depending on the degree of match in each of these areas, a score of 1-10 is assigned for each area. For example, in the area or subject of music, a score of 10 might be assigned when both assessed individuals have a preference for opera, or a score of 1 when one individual has a preference for opera and the other has a preference for rap. For the purpose of this example, assume the following scores in the following areas for a first and second candidate, respectively: religion—10 and 1, outside interest—10 and 5, hobbies—5 and 10, music—10 and 5, movies—5 and 5, and food—10 and 1.

One's degree of preference compliance for matching purposes is then taken to be the sum of these scores over the weighted subjected areas assessed. For example, the scores of the above candidates would be: First: 2(10)+2(20)+2(5)+1(10)+0.5(5)+0.5(10)=67.5; Second: 2(1)+2(5)+2(10)+1(5)+0.5(5)+0.5(1)=40. Thus, using this type of a second algorithmic 24 step or process, the first candidate would be judged or assessed to be a better match for this service user seeking a match than would the second candidate.

Again, since there are many, well-known algorithmic processes or algorithms that be used for this matching task, these algorithmic processes wilt not be discussed further herein. All such well-know, second or matching algorithmic processes are considered to come within the scope of the present invention.

This matching information can be presented to a system user in a number of ways. For example, a system user could, on a website on which the user had registered to be a system user and on which the user was assessed to determine the user's own personality category and preferences and on which the user was currently logged onto, be shown information on the profiles of those individuals which the system's assessments had determined to be the best possible match with the system user.

This profile information can be displayed in many formats. For example, the system user could be presented with the opportunity to see the previously mentioned degree of match (i.e., 1-10, with 10 being a perfect match) in a number of preference subject areas or personality dimensions. This message could take the form of "you had a match in the range of 9-10 to three individuals or match candidates with respect to your musical interests." Such a message could be a prelude to actually sharing the various users' contact information. Additionally, the system user could be shown overall match scores (e.g., 67.5 or 40, see above) over all those preference-assessed subject areas which the system user has indicated were important as part of the user's system registration.

Some portion of this preference and matching information could be presented in such a way as to initially introduce system users while protecting or preserving their anonymity. A means for doing this could easily be configured as one of the screen shots of the present system that would display on the system's user interface. An additional benefit of sharing this information is that it helps to identify areas of mutual interests before any initial introductions are made. This should serve to make such introductory meetings less stressful and minimize the amount of time spent in asking each other a series of potentially communication-stifling questions.

To facilitate a possible first meeting of system users, the website of the present invention has the capability to allow a user to mine the system's database of user assessments to try to find venues (e.g., restaurants specializing in a cuisine for which both users have a preference, facilities associated with shared outside interests—baseball (e.g., in Baltimore: Camden Yards)) that would be expected to be a mutually compatible site for an introductory meeting.

The system of the present invention can be implemented using a number of technologies. These include the use of various webpages on a website, cloud-based service platform, mobile application, software service or similar communication means that is maintained to publicize the services of the present invention and to enable the service users' registration processes, etc. Special software applications of the present invention can be created to run on various computing devices (e.g., smart phones) that can be used by the present invention in providing its service of optimally matching individuals seeking to establish personal relationships. Mobile platforms prove to be especially effective for utilizing the unique interface of the present invention because they end up providing faster and better user assessments and matching than the traditional question-and-answers methods.

To implement the present invention, there are certain key background steps or tasks that must be accomplished, these include:

(a) identifying a plurality of personality categories 14 into which an individual may be categorized based upon the behavior that is predicted for said individual, (b) identifying and establishing, as a result of one knowledge's of the psychology literature, a set of personality traits 10 that are configured such that a specific set of these personality traits categorizes san individual into one of the plurality of personality categories and are predictive of how an individual who possesses a subset of these personality traits is most likely to behave in different situations and make selection decisions as they relates to choosing between an array of available experiences, etc.

Figure 7:
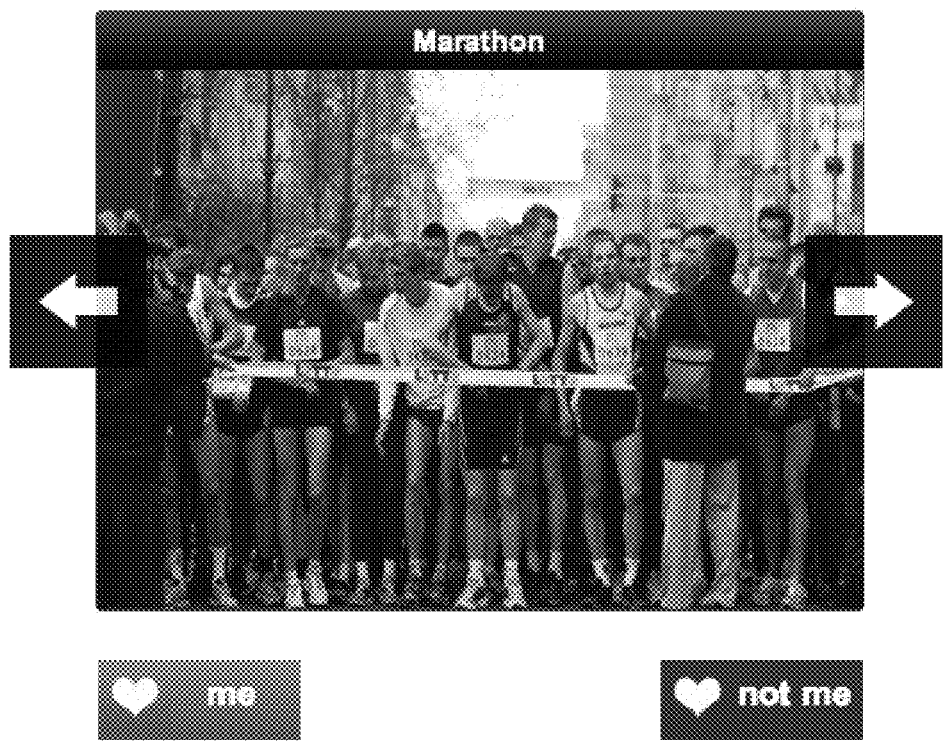
FIG. 7 provides an example of an image to which has been applied the personality trait scoring or assignment process of the present invention.
Figure 8:
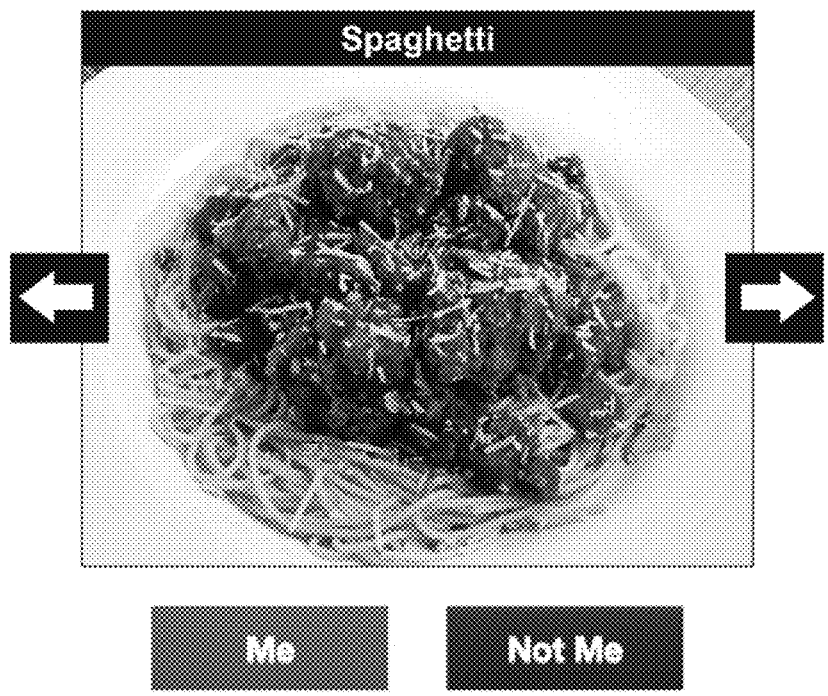
FIG. 8 provides an example of an image of a subject area on which one is being assessed for his/her preferences and where the image has been scored with various preference information.

(c) identifying a plurality of preferences 12 on various subjects that an individual may have and which are configured such that a specific set of these preferences is informative of how an individual would make a selection decision regarding the various subjects, (d) compiling a collection of images 14 that are representative of an array of experiences; note that the use of the term images should be given its broadest definition so as to include not just static, visual images, but also videos that may or may not have sound and even recording images of music and other types of sound or writings joined to these images, (e) scoring 20 each of these images 14 by assigning to each ranked personality traits and preferences in various subject areas based, from a psychological viewpoint, on whether a user viewing the image would or would not be likely to identify with or to elect to participate-in the experience or activity represented in the image. See FIG. 7 for an example of an image to which has been applied personality trait scoring and FIG. 8 for an example of an image to which has been applied preference scoring for a subject area that is to be assessed, (f) providing a means or image viewer or user interface 16 for an individual to view these images and identify with which of these images the user elects to be associated, and then establishing, based upon the user's identified associations and the scoring of the images, personality traits and preferences in various subject areas for the user; where one could use as an image viewer, e.g., a website that provides this matching services and wherein the user uses his/her computer to access, over the internet, the website to view the images on the user's own monitor or display screen, (g) identifying a first algorithm that is configured to utilize these elected associations of an individual to categorize the individual into one of the personality categories established and defined by the present invention, (h) identifying a second algorithm that is configured to optimally match an individuals seeking to establish personal relationships by utilizing the personality category and ascribed specific set of preferences in various subject areas for each of those candidate individuals who are seeking to establish personal relationships, and (i) communicating information to one of the individuals seeking to establish a personal relationship that pertains to the preferences of another of the individuals seeking to establish a personal relationship in order to serve to introduce the individuals while preserving their anonymity.

In seeking to obtain optimal matches, it often proves useful to ask a service user to view more than the initial set of images. For example, in assessing a user's preferences in various subject areas, image packets or slider presentations have been developed which are especially configured to assess and measure what a service or system user is looking for in the person that the user is seeking—i.e., one's preferences in a specific subject area. Examples of some things that might be "looked for" and assessed for their importance by such especially configured sliders of the present invention include one's: physical appearance, communication style or skills, social style or skills, activity preferences, sense of humor, etc.

The subtle and non-judgmental form of the present invention's sliders makes it possible for a user to be assessed for what we refer to as any "deal breaker" preferences which he or she may have and which would not be identified with the typical user questionnaire that is the data input or user interface of many current matching services.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that are set forth in the claims to the invention.

We claim:

1. A system for optimally matching individuals seeking to establish personal relationships, said system comprising:
   an image viewer,
   a processor,
   identified personality categories into which an individual is categorized based upon the behavior that said individual exhibits,
   identified dichotomous, personality traits that are predictive of the behavior that is most likely to be exhibited by an individual that possesses a specific set of said personality traits,
   an identified plurality of photographic images for viewing by said individual, wherein a plurality of said identified dichotomous personality traits are ranked and assigned to each of said plurality of photographic images based on psychological content of the respective photographic image, whereby an individual who chooses to be associated with a particular one of said plurality of photographic images can from a psychological perspective be assessed to possess said assigned plurality of said identified dichotomous personality traits,
   a selection-enabling, user interface for use by each of said individuals, wherein said selection-enabling, user interface having a configuration adapted to use said image viewer to individually present a digital version of each of said plurality of photographic images to each of said individuals, a selection-identifying tool for use by each of said individuals, wherein said selection-identifying tool having a configuration adapted to use said input device to allow each of said individuals to identify with which of said photographic images each of said individuals selects to be associated and to input into said processor said identification of which of said photographic images each of said individuals selects to be associated, an identified first algorithm having a configuration adapted to utilize those photographic images with which said individual selects to be associated and the related plurality of said identified dichotomous personality traits that are ranked and assigned to each of said photographic images to categorize said individual into one of said personality categories, and wherein said processor having a configuration adapted to apply said first algorithm to said selected associations of said individual to identify into which of said personality categories said individual is categorized for the purpose of matching said individual to another individual who has been similarly categorized.

2. The system for optimally matching individuals as recited in claim 1, said system further comprising:

an identified plurality of preferences on various subjects that are predictive of the how an individual that possesses a specific set of said preferences is most likely to make a selection decision regarding said various subjects, wherein said identified plurality of photographic images for viewing by said individual have further assigned to each of said plurality of photographic images a plurality of said identified preferences on various subjects, wherein said identified preferences on various subjects are ranked and assigned to each of said plurality of photographic images based on psychological content of the respective photographic image, whereby an individual who chooses to be associated with a particular one of said plurality of photographic images can from a psychological perspective be assessed to possess said assigned plurality of said identified preferences on various subjects, wherein said configuration of said first algorithm is furthered adapted to utilize those photographic images with which said individual elects to be associated and the related plurality of said identified preferences on various subjects that are ranked and assigned to each of said photographic images to ascribe to said individual a specific set of said plurality of said identified preferences on various subjects.

3. The system for optimally matching individuals as recited in claim 1, said system further comprising:

an identified second algorithm having a configuration adapted to utilize both said personality catergory into which said individual has been categorized and said specific set of said plurality of said identified preferences on various subjects ascribed to said individual to optimally match said individuals seeking to establish personal relationships, and wherein the configuration of said processor is further adapted to apply said second algorithm to optimally match said individuals seeking to establish personal relationships.

4. The system for optimally matching individuals as recited in claim 2, said system further comprising:

an identified second algorithm having a configuration adapted to utilize both said personality category into which said individual has been categorized and said specific set of said plurality of said identified preferences on various subjects ascribed to said individual to optimally match said individuals seeking to establish personal relationships, and wherein the configuration of said processor is further adapted to apply said second algorithm to optimally match said individuals seeking to establish personal relationships.

5. The system for optimally matching individuals as recited in claim 4, wherein said configuration of said second algorithm is further adapted to identify matches between individuals who have similar personality categorizations.

6. The system for optimally matching individuals as recited in claim 4, wherein said configuration of said second algorithm is further adapted to identify matches which seek to maximize the degree of compliance which each individual has with the specific set of preferences of the other individual.

7. The system for optimally matching individuals as recited in claim 6, said system further comprising:

a communication of information to one of said individuals seeking to establish a personal relationship that pertains to the preferences of another individual seeking to establish a personal relationship and which serves to introduce said individuals while preserving the anonymity of said individuals.

8. A method, performed by a computer of the type having an image viewer, an input device and a processor, for optimally matching individuals seeking to establish personal relationships, said method comprising the step of:

identifying a plurality of personality categories into which an individual is categorized based upon the behavior that said individual exhibits, identifying dichotomous, personality traits that are predictive of the behavior that is most likely to be exhibited by an individual that possesses a specific set of said personality traits, identifying a plurality of photographic images for viewing by said individual, wherein a plurality of said identified dichotomous personality traits are ranked and assigned to each of said plurality of photographic images based on psychological content of the respective photographic image, whereby an individual who chooses to be associated with a particular one of said plurality of photographic images can from a psychological perspective be assessed to possess said assigned plurality of said identified dichotomous personality traits, enabling said image viewer to perform the function of being a selection-enabling, user interface for use by each of said individuals, wherein said selection-enabling, user interface having a configuration adapted to use said image viewer to individually present a digital version of each of said plurality of photographic images to each of said individual, enabling said input device to perform the function of being a selection-identifying tool for use by each of said individuals, wherein said selection-identifying tool having a configuration adapted to use said input device to allow each of said individuals to identify with which of said photographic images each of said individuals selects to be associated and to input into said processor said identifications of which of said photographic images each of said individuals selects to be associated, identifying a first algorithm having a configuration adapted to utilize those photographic images with which said individual elects to be associated and the related plurality of said identified dichotomous personality traits that are ranked and assigned to each of said photographic images to categorize said individual into one of said personality categories, utilizing said processor to apply said first algorithm to said selected associations of said individual to identify into which of said personality categories each of said individual is categorized, and matching said individuals seeking to establish personal relationships on the basis of each of said individuals having been categorized into the same one of said personality categories.

9. The method optimally matching individuals as recited in claim 8, further comprising the step of:

identifying a plurality of preferences on various subjects that are predictive of the how an individual that possesses a specific set of said preferences is most likely to make a selection decision regarding said various subjects, wherein said identified plurality of photographic images for viewing by said individual have further assigned to each of said plurality of photographic images a plurality of said identified preferences on various subjects, wherein said identified preferences on various subjects are ranked and assigned to each of said plurality of photographic images based on psychological content of the respective photographic image, whereby an individual who chooses to be associated with a particular one of said plurality of photographic images can from a psychological perspective be assessed to possess said assigned plurality of said identified preferences on various subjects, wherein said configuration of said first algorithm is furthered adapted to utilize those photographic images with which said individual elects to be associated and the related plurality of said identified preferences on various subjects that are ranked and assigned to each of said photographic images to ascribe to said individual a specific set of said plurality of said identified preferences on various subjects.

10. The method for optimally matching individuals as recited in claim 8, said method further comprising the step of:

identifying a second algorithm having a configuration adapted to utilize both said personality category into which said individual has been categorized and said specific set of said plurality of said identified preferences on various subjects ascribed to said individual to optimally match said individuals seeking to establish personal relationships, and utilizing said processor to apply said second algorithm to optimally match said individuals seeking to establish personal relationships.

11. The method for optimally matching individuals as recited in claim 9, said system further comprising the step of:

identifying a second algorithm having a configuration adapted to utilize both said personality category into which said individual has been categorized and said specific set of said plurality of said identified preferences on various subjects ascribed to said individual to optimally match said individuals seeking to establish personal relationships, and utilizing said processor to apply said second algorithm to optimally match said individuals seeking to establish personal relationships.

12. The method for optimally matching individuals as recited in claim 11, wherein said configuration of said second algorithm is further adapted to identify matches between individuals who have similar personality categorizations.

13. The method for optimally matching individuals as recited in claim 12, wherein said configuration of said second algorithm is further adapted to identify matches which seek to maximize the degree of compliance which each individual has with the preference profile of the other individual.

14. The method for optimally matching individuals as recited in claim 13, said method further comprising the step of:

communicating information to one of said individuals seeking to establish a personal relationship that pertains to the preferences of another individual seeking to establish a personal relationship and which serves to introduce said individuals while preserving the anonymity of said individuals.

\* \* \* \* \*